United States Patent
Ma et al.

(10) Patent No.: US 11,330,218 B2
(45) Date of Patent: May 10, 2022

(54) SPLIT-READOUT IMAGE SENSOR

(71) Applicant: Gigajot Technology, Inc., Pasadena, CA (US)

(72) Inventors: Jiaju Ma, Monrovia, CA (US); Saleh Masoodian, Monrovia, CA (US)

(73) Assignee: Gigajot Technology, Inc., Pasadena, CA (US)

(*) Notice: Subject to any disclaimer, the term of this patent is extended or adjusted under 35 U.S.C. 154(b) by 241 days.

(21) Appl. No.: 16/871,720

(22) Filed: May 11, 2020

(65) Prior Publication Data

US 2020/0275043 A1 Aug. 27, 2020

Related U.S. Application Data

(63) Continuation-in-part of application No. 16/802,518, filed on Feb. 26, 2020, now abandoned, which is a continuation of application No. 16/548,251, filed on Aug. 22, 2019, now Pat. No. 10,616,523.

(60) Provisional application No. 62/721,183, filed on Aug. 22, 2018.

(51) Int. Cl.
  *H04N 5/335* (2011.01)
  *H04N 5/378* (2011.01)
  *H04N 5/355* (2011.01)

(52) U.S. Cl.
  CPC ............. *H04N 5/378* (2013.01); *H04N 5/355* (2013.01)

(58) Field of Classification Search
  CPC .................................................... H04N 5/378
  See application file for complete search history.

(56) References Cited

U.S. PATENT DOCUMENTS

| | | |
|---|---|---|
| 7,518,645 B2 | 4/2009 | Farrier |
| 7,531,858 B2 | 5/2009 | Lee |
| 8,797,434 B2 | 8/2014 | Lee et al. |
| 9,936,153 B1 | 4/2018 | Mao et al. |
| 10,616,523 B2 | 4/2020 | Ma et al. |

FOREIGN PATENT DOCUMENTS

| | | |
|---|---|---|
| EP | 2046022 A1 | 4/2009 |
| WO | 2006073875 A2 | 7/2006 |

OTHER PUBLICATIONS

International Bureau of World Intellectual Property Organization (WIPO), International Preliminary Report on Patentability dated Mar. 4, 2021 in International Application No. PCT/US2019/047696, 7 pages.

World Intellectual Property Organization (WIPO), International Search Report and Written Opinion dated Nov. 19, 2019 in International Application No. PCT/US2019/047696, 11 pages.

*Primary Examiner* — Gary C Vieaux
(74) *Attorney, Agent, or Firm* — Charles Shemwell

(57) ABSTRACT

First and second readout circuits, each having a respective floating diffusion node, are coupled to a photodetection element within a pixel of an integrated-circuit image sensor. Following an exposure interval in which photocharge is accumulated within the photodetection element, a first portion of the accumulated photocharge is transferred from the photodetection element to the first floating diffusion node to enable generation of a first output signal within the first readout circuit, and a second portion of the accumulated photocharge is transferred from the photodetection element to the second floating diffusion node to enable generation of a second output signal within the second readout circuit. A digital pixel value is generated based on the first and second output signals.

20 Claims, 6 Drawing Sheets

Split-Readout Pixel

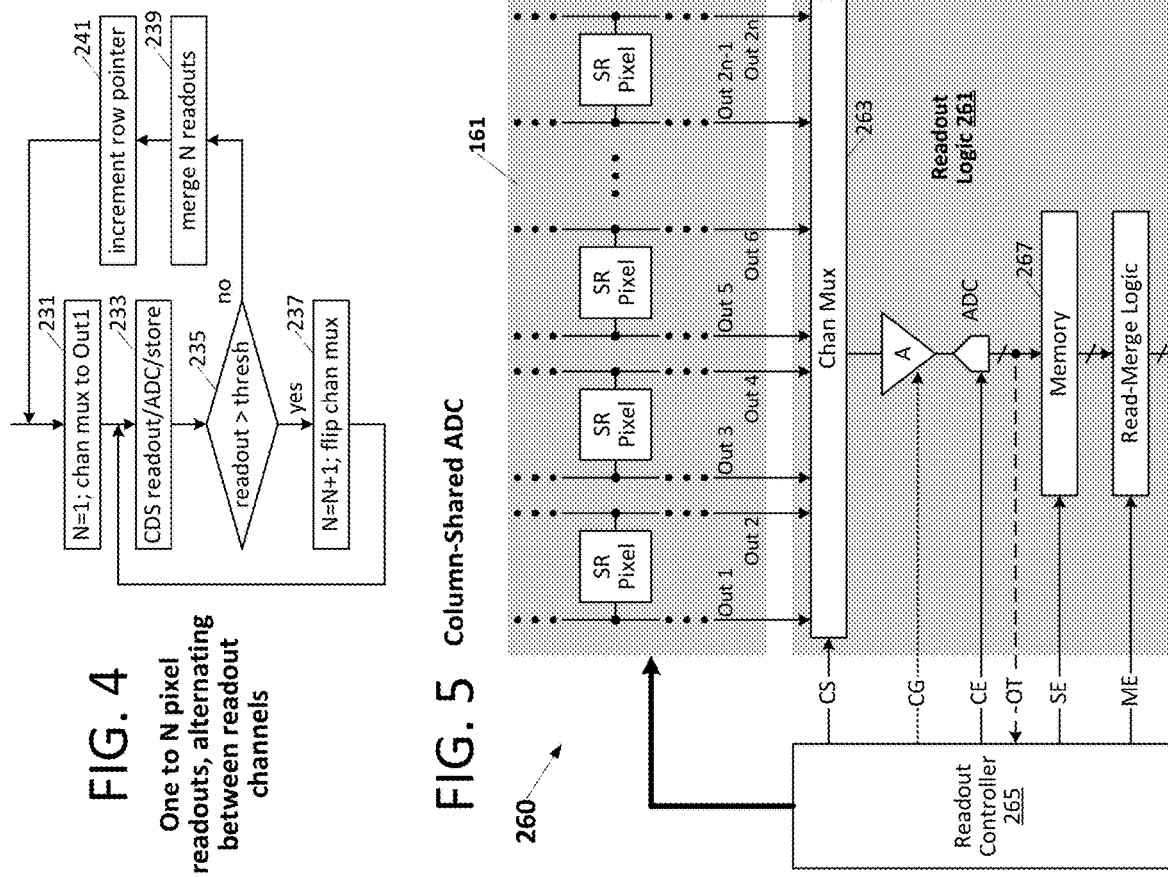
FIG. 4 One to N pixel readouts, alternating between readout channels
FIG. 5 Column-Shared ADC
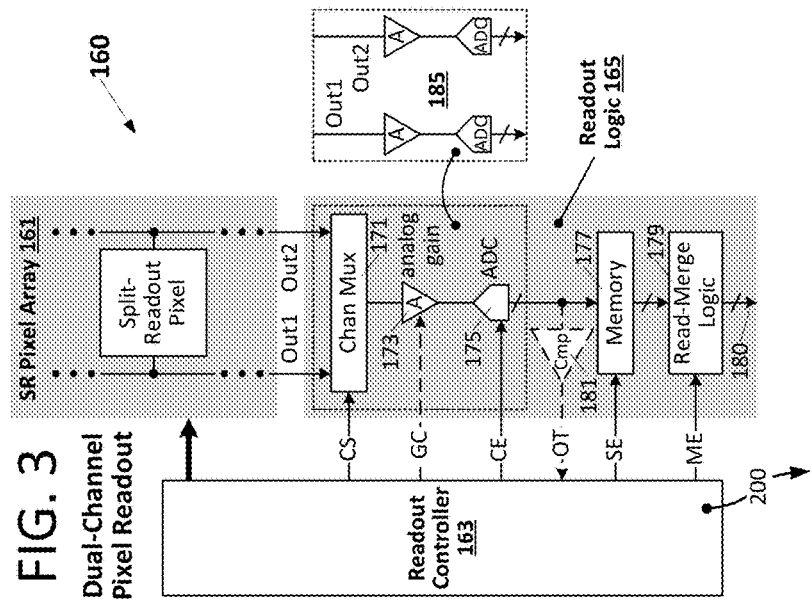
FIG. 3 Dual-Channel Pixel Readout
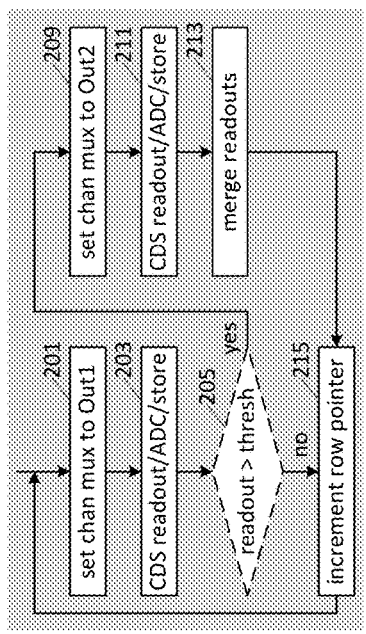

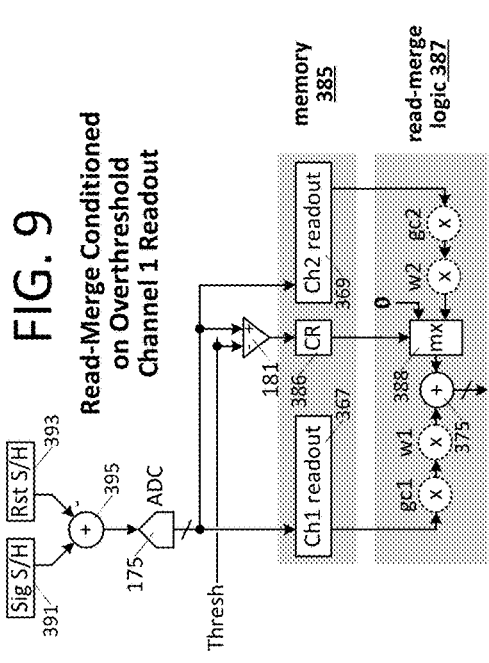
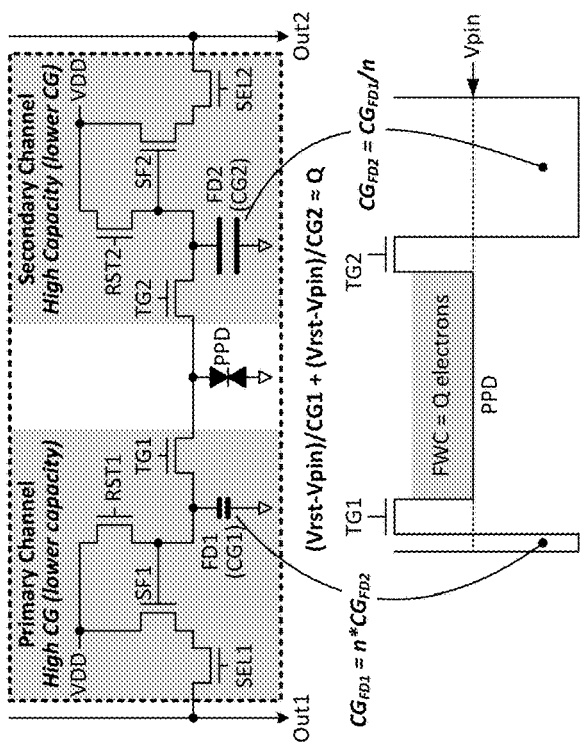
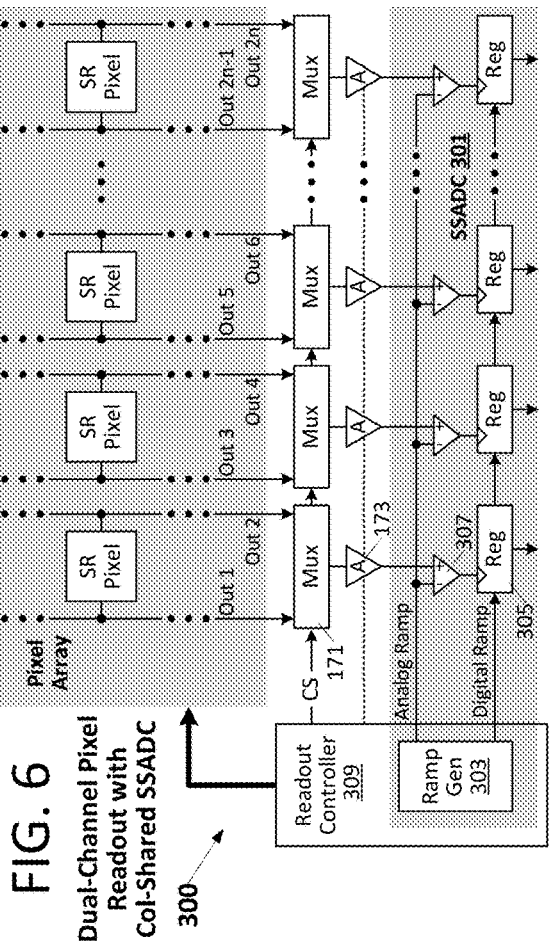
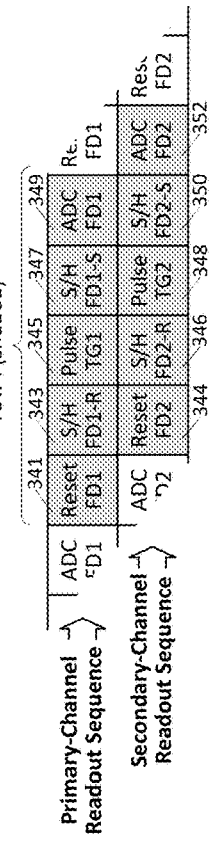

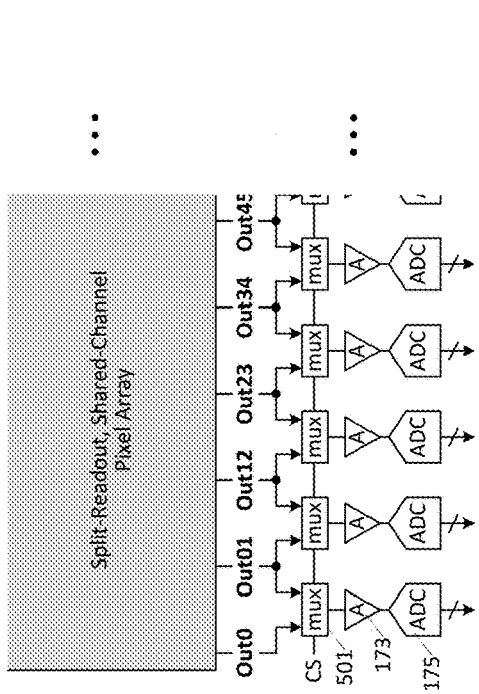
FIG. 13
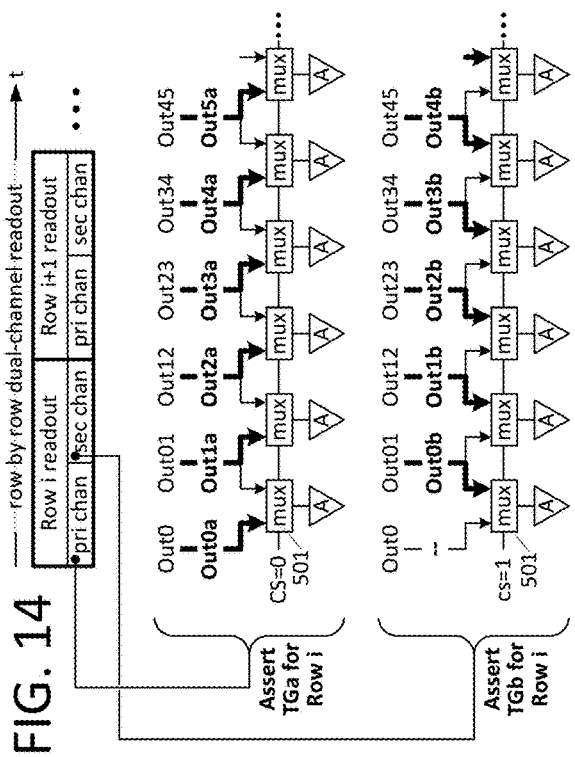
FIG. 14
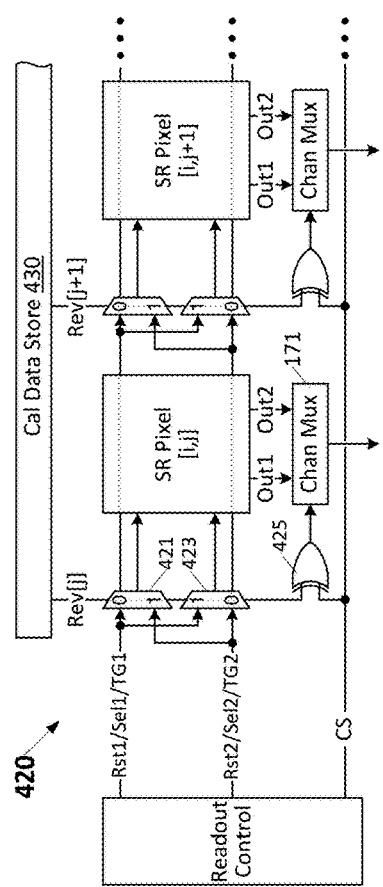
FIG. 11
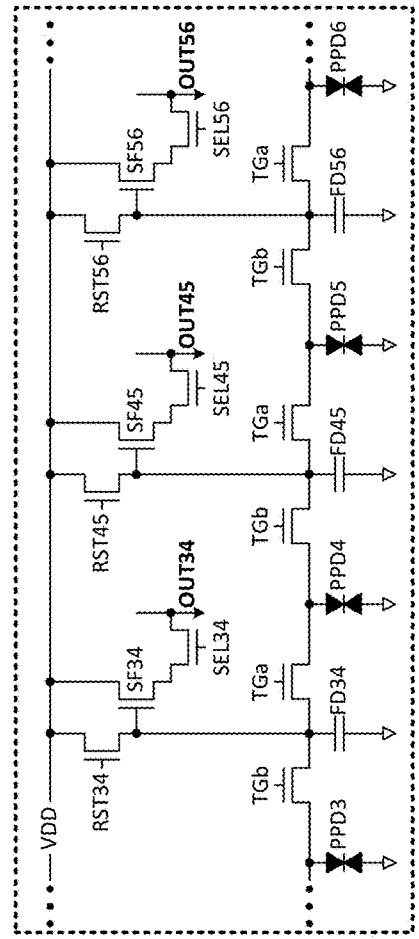
FIG. 12 Split-Readout Pixels with Shared Readout Channels

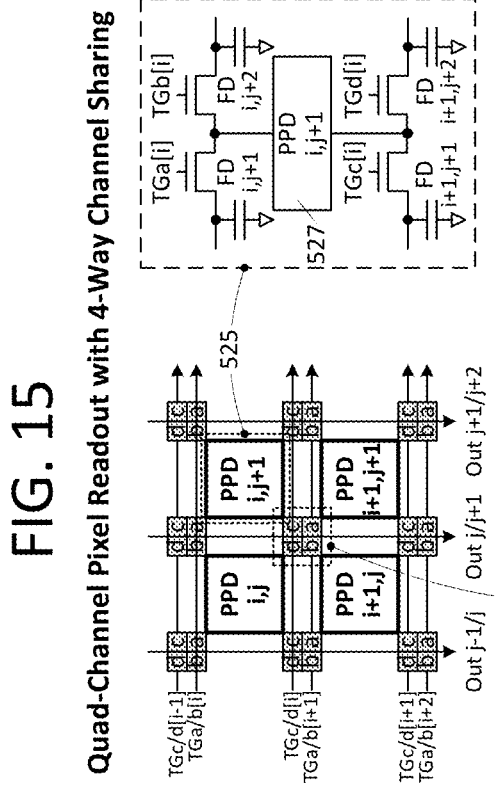

SPLIT-READOUT IMAGE SENSOR

CROSS-REFERENCE TO RELATED APPLICATIONS

This application is a continuation-in-part of U.S. patent application Ser. No. 16/802,518 filed Feb. 26, 2020, which is a continuation of U.S. patent application Ser. No. 16/548,251 filed Aug. 22, 2019, which claims the benefit of U.S. Provisional Application No. 62/721,183 filed Aug. 22, 2018. Each of the foregoing applications is hereby incorporated by reference.

TECHNICAL FIELD

The disclosure herein relates to high dynamic range image sensors.

INTRODUCTION

Dynamic range in modern CMOS (complementary metal oxide semiconductor) image sensors is generally constrained by pixel full well capacity in bright light conditions and by input-referred read noise in low-light conditions. In 4-transistor (4T) pixels, input-referred read noise can be reduced by raising the conversion gain of the photocharge transfer from photodiode to floating diffusion read-out node—that is, reducing capacitance of the floating diffusion relative to the photodiode so that each transferred photocarrier (electron in an N-type MOS pixel implementation) yields a larger read-out voltage step. On the other hand, increasing conversion gain beyond a given point prevents complete photocharge transfer (the floating diffusion will reach its output voltage limit with fewer transferred electrons), reducing the effective full well capacity of the pixel and compromising bright light sensitivity.

DRAWINGS

The various embodiments disclosed herein are illustrated by way of example, and not by way of limitation, in the figures of the accompanying drawings and in which like reference numerals refer to similar elements and in which:

FIG. 3 illustrates an embodiment of an integrated-circuit imaging system having an array of split-readout pixels;

FIG. 4 illustrates an alternative readout sequence that may be implemented by readout controller of FIG. 3;

FIG. 5 illustrates an alternative imaging IC architecture in which column readout logic is shared among multiple (or all) columns of split-readout pixels within a pixel array;

FIG. 6 illustrates another imaging architecture in which a single-slope A/D converter is distributed across readout logic paths of multiple (or all) split-readout pixel columns within a pixel array;

FIG. 7 illustrates exemplary pipelining of primary and secondary channel readouts, showing time-staggered primary channel correlated-double-sampling (CDS) operations and secondary channel CDS operations;

FIG. 8 illustrates embodiments of per-column memory elements and read-merge logic that may be used to implement the memory and read-merge logic components shown in FIG. 3;

FIG. 9 illustrates an alternative read-merge logic embodiment that selectively zeroes the contribution of the secondary readout channel according to an under/over-threshold condition of the primary channel output;

FIG. 10 illustrates an embodiment of a split-readout pixel having non-uniform primary and secondary readout-channel conversion gains and corresponding floating-diffusion node capacities that collectively match the photodiode full-well capacity;

FIG. 11 illustrates a split-readout image sensor embodiment in which the primary-channel/secondary-channel designation within each pixel may be selectively and programmatically swapped according to a calibration-time noise assessment;

FIG. 12 illustrates an embodiment of a split-readout pixel array in which the secondary readout channel for one pixel serves as the primary readout channel for an adjacent pixel—a shared readout-channel arrangement that extends across the pixel array to maintain the total transistor count at or near that of a conventional single-readout-channel pixel array;

FIG. 13 illustrates a channel multiplexing arrangement that may be implemented in the column-readout logic of an imager having a shared-channel split-readout pixel array per FIG. 12;

FIG. 14 illustrates an exemplary operation of channel multiplexers corresponding to those shown in FIG. 13;

FIG. 15 illustrates a portion of a split-readout pixel array having four shared readout channels per pixel;

FIG. 16 illustrates an exemplary channel multiplexing arrangement with respect to the four different channel readouts from each of the pixels within a given row of the FIG. 15 pixel array;

DETAILED DESCRIPTION

Figure 1:
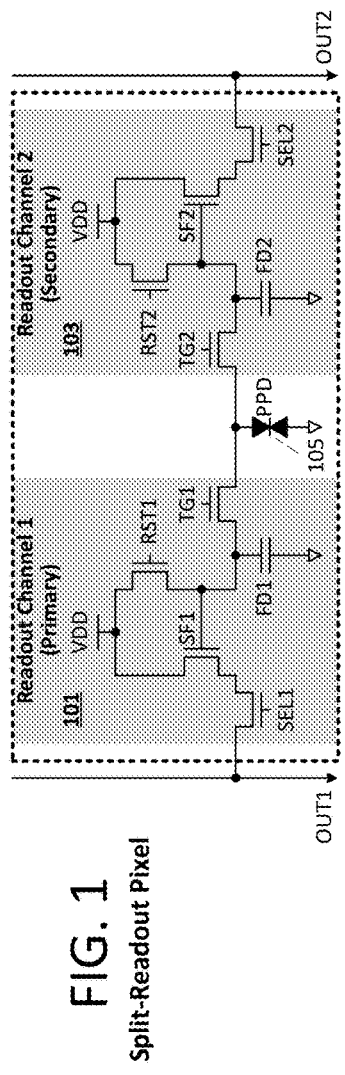
FIG. 1 illustrates an embodiment of a split-readout pixel that enables high-conversion-gain readout without compromising the full photocharge transfer required for maximum bright light performance.

Integrated-circuit image sensors having two or more readout channels per photodetection element—a primary readout channel and one or more secondary readout channels—are disclosed in various embodiments herein. In a number of embodiments, each of the readout channels coupled to the photodetection element includes a respective transfer gate/floating diffusion node pair and the primary readout channel, at least, has an exceptionally high conversion gain that enhances low-light sensitivity (extremely low input-referred noise) in exchange for photocharge transfer capacity below the full well capacity of the photodetection element. Readout via the one or more secondary readout channels drains any residual photocharge (after primary channel readout) from the photodetection element, effecting a combined primary/secondary channel photocharge transfer (and readout) up to the full well capacity of the photodetection element and thus maximizing bright-light sensitivity (and dynamic range). Accordingly, bright-light pixel readout is split into at least two phases: a phase-one readout via the primary channel in which a portion of the photodetector-accumulated charge is transferred to the primary-channel floating diffusion node to generate a primary readout signal, followed by a phase-two readout via the secondary channel readout in which the residual/remaining charge within the photodetector is transferred to the floating diffusion node of the secondary channel to generate a secondary readout signal. The split readout signals—primary and secondary—are combined before or after digitization to yield a composite readout signal corresponding to the total photocharge accumulated within the photodetector during a given exposure interval. In embodiments having multiple secondary readout channels, the primary readout signal is combined with two or more successively generated secondary readout signals to produce the composite readout signal. In other embodiments, the primary and/or secondary readout channels may be iteratively enabled to yield three or more readout signals that are combined to yield the composite readout signal (e.g., primary channel readout, secondary channel readout, and then another primary channel readout, etc.). In yet other embodiments, constituent operations within the primary channel readout and secondary channel readout are pipelined (executed in staggered but overlapping time intervals) to reduce multi-phase readout time, primary and secondary channels may be implemented with non-uniform conversion gains, channel-shared or non-shared analog-to-digital conversion circuitry may be implemented, conversion gain calibration operations are carried out to normalize constituent readout signals/values prior to or as part of their combination into the composited output signal/value, readout channels are programmatically established as primary or secondary based on noise assessment (carried out at device startup or during device production) or other factors, and/or readout circuitry is shared between two or more split-readout (multi-readout-channel) pixels to reduce transistor count/increase fill-factor within the pixel array. These and other features and embodiments are described in greater detail below.

FIG. 1 illustrates an embodiment of a split-readout pixel 100 that enables high-conversion-gain readout without compromising the full photocharge transfer required for maximum bright light performance and thus achieves higher dynamic range than conventional pixel architectures. Split-readout pixel 100 includes two readout channels, primary 101 and secondary 103, coupled to a photodetection element 105—a pinned photodiode (PPD) in this example and others presented below, though any other practicable charge accumulating photodetector may be used in all cases. Except for possible differences in component sizing and physical layout, the primary and secondary readout channels are identically implemented with each channel including a respective transfer gate (TG1, TG2), floating diffusion node (FD1, FD2), source-follower transistor (SF1, SF2), reset transistor (RST1, RST2) and read-select transistor (SEL1, SEL2).

When operated in a deterministic readout mode, the primary readout channel and secondary readout channel are enabled in succession (i.e., after photocharge accumulation within photodiode 105 during an exposure interval) to produce primary and secondary output signals, respectively, on column output lines OUT1 and OUT2. Primary channel readout commences with a RST1 pulse (designations of transistors and their gate signals are used interchangeably herein) to reset floating diffusion FD1, and also with SEL1 assertion to couple the source terminal of the source-follower transistor (SF1) to output line OUT1 via the read-select transistor. Floating diffusion node FD1 is coupled to the gate of source-follower transistor SF1 which is biased (e.g., by a constant current source on column-output line OUT1) to drive a signal onto OUT1 that tracks (e.g., rises and falls in proportional to) the FD1 potential. Thus, after SEL1 assertion and RST pulse, the primary channel generates an output signal (on OUT1) corresponding to the reset potential of FD1—a reset-state signal that, in a correlated double-sample (CDS) readout, is sampled by downstream readout circuitry to establish a baseline for subsequent readout signal generation. Shortly after FD1 reset, transfer gate TG1 is switched on (TG1 pulse) to enable photocharge transfer from the pinned photodiode to FD1 and thereby change the potential of the floating diffusion according to the number of transferred carriers (electrons in the NMOS pixel implementation of FIG. 1) multiplied by the voltage step per carrier, the latter being the conversion gain of the charge transfer operation.

In the FIG. 1 implementation, primary channel 101 (at least) is implemented with an exceptionally high conversion gain (yielding correspondingly low input-referred noise that enables enhanced low-light sensitivity) at the cost of reduced photocharge transferability. That is, transfer of a photocharge quantum less than the full well capacity of photodiode 105 will drive FD1 to the photodiode pinning voltage (at which point charge transfer ceases) so that, under relatively bright-light conditions, a portion of accumulated photocharge will remain in the photodiode after primary channel readout. Said another way, the primary readout signal is driven to the same output limit for any photocharge accumulation beyond the quantum that drives FD1 to the photodiode pinning voltage—in effect hitting the capacity limit of the floating diffusion node—and thus lacks resolution at the bright end of the charge-accumulation range. An ensuing readout via the secondary channel avoids this loss of dynamic range, transferring the residual photocharge from photodiode 105 to floating diffusion node FD2 (after resetting FD2, switching on SEL2 and optionally reading the FD2 reset level) to yield a secondary readout signal that may be merged with the primary signal before or after digitization to produce a composite readout signal (or digital readout value) representative of total accumulated photocharge.

Figure 2:
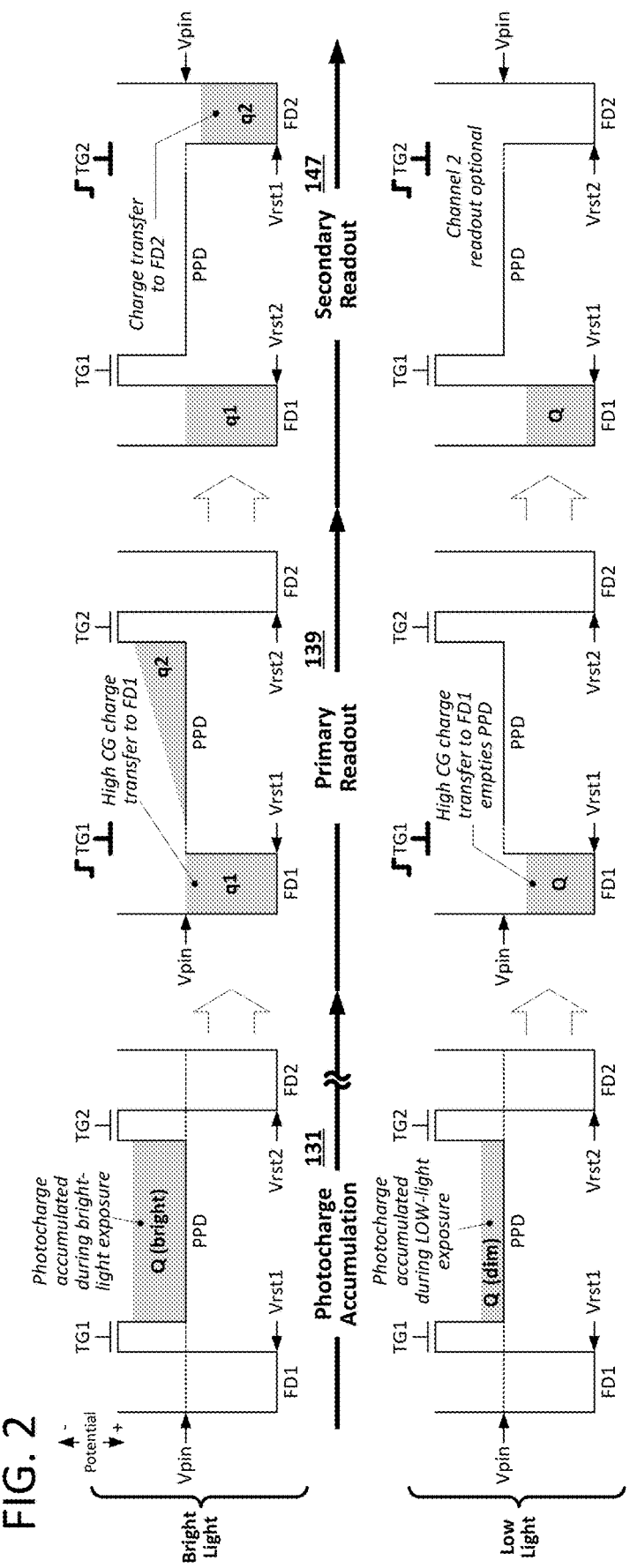
FIG. 2 illustrates exemplary photocharge transfer operations within the split-readout pixel of FIG. 1 under bright-light and low-light conditions.

FIG. 2 illustrates exemplary photocharge transfer operations within the split-readout pixel of FIG. 1 under bright-light and low-light conditions (note that a high contrast scene may simultaneously expose some pixels to bright light and others to dim or no light). In the bright-light example, photocharge Q approaching the well capacity of the pinned photodiode is accumulated during an exposure interval (131) followed by primary and second readouts (139 and 147). In primary readout 139, photocharge is transferred with high conversion gain from the pinned photodiode to the primary-channel floating diffusion (FD1) until FD1 reaches the pinning potential of the photodiode, a point of equilibrium at which charge flow (current) ceases due to lack of electric field. In the depicted example, a number of carriers q1 are transferred to FD1 according to FD1's maximum output voltage swing, Vpin−Vrst1 (where Vrst1 is, for example, the VDD supply voltage less the threshold drop across transistor RST1), divided by the primary channel conversion gain (CG1), leaving q2 (=Q−q1) carriers within the photodiode. In secondary readout 147, the residual photocharge q2 is transferred to FD2, emptying the photodiode. In both the primary and secondary readouts, the floating diffusion nodes are reset prior to charge transfer with the reset-states thereof optionally read-out to enable correlated double sampling (CDS) with respect to the primary and secondary "charge-state" signals generated respectively on OUT1 and OUT2 in response to the primary and secondary channel photocharge transfers. In any case, the primary and secondary channel readouts are merged in the digital or analog domain to yield a composite signal indicative of net photocharge accumulated within the photodiode during exposure interval 131.

Low-light exposure yields a much smaller photocharge accumulation—below the output-swing-limited capacity of (q1) of the primary channel floating diffusion node (FD1) so that the high-conversion-gain primary readout completely empties the pinned photodiode. In a number of embodiments, the secondary channel readout is skipped in this case, conserving power and, in some embodiments, reducing total readout latency. When the photocharge accumulation in the photodiode is lower than the q1 limit (the effective capacity of FD1), the entirety of the accumulated photocharge can be transferred to FD1 without any charge transfer lag induced by potential barriers or defects. Similarly, when the photocharge remaining within the photodiode after the transfer to FD1 is below the FD2 capacity that photocharge can be transferred to FD2 without charge transfer lag.

Although floating diffusion nodes FD1 and FD2 are implemented with nominally uniform (equal) capacities in the embodiment of FIG. 2, the two floating diffusion nodes and thus the primary and secondary readout channels are implemented with imbalanced (non-equal/non-uniform) but complementary conversion gains in alternative embodiments—an arrangement that raises the conversion gain of the primary readout channel to enable high performance low-light readout (high conversion gain, low input-referred noise) and correspondingly lowers the conversion gain of the secondary readout channel low to ensure that the combined primary-channel/secondary-channel charge transfer capacity matches (or nearly matches or exceeds) the photodiode full well capacity. Also, regardless of whether the two readout channels are implemented with nominally equal or complementary/imbalanced conversion gains, provision of two readout channels enables pipelined readout operations not possible with a single-channel implementation. For example, photocharge transfer may commence in the secondary readout channel shortly or immediately after photocharge transfer in the primary channel and thus without waiting for the primary readout signal to settle—avoiding a relatively long delay between primary and secondary charge-state readouts that might otherwise produce motion artifacts (i.e., objects in scene moving in interval between primary and secondary readouts) or other distortion. Additionally, in applications requiring high frame rate (rapid pixel array scan), single-channel readout may be implemented to reduce row readout time—for example, executing a readout only via the secondary readout channel (via FD2 and not via FD1) where that channel has a larger charge transfer limit or, in low light conditions, executing readout only via the primary channel where that channel has a lower charge transfer limit and higher conversion gain.

FIG. 3 illustrates an embodiment of an integrated-circuit imaging system 160 (e.g., complementary MOS imager) having an array of split-readout (SR) pixels 161, readout controller 163 and readout logic 165 for a column-wise slice of the pixel array. As shown, readout logic 165 includes a channel multiplexer 171, analog gain element 173, analog-to-digital converter (ADC) 175, storage memory (or buffer) 177 and read-merge logic 179, all or most of which operate in response to control signals from readout controller 163 (the analog gain component optionally receives one or more gain control signals (GC) that may be used to alternate between gains for primary and secondary channel readout and/or provide calibration control for selected gains). The readout controller additionally outputs control signals to pixel array 161, including a transfer gate signal pair (one for each channel), read-select signal pair and reset signal pair for each pixel row to enable row-sequenced, column-parallel readout.

Still referring to FIG. 3, channel multiplexer 171 sequentially feeds the primary and secondary output signals (Out1 and Out2) to the analog gain component in response to an alternating (toggling) channel-select signal (CS). In one embodiment, analog gain component 173 includes both a current source to bias the selected readout channel (i.e., enable source-follower operation within the readout channel as discussed above) and a voltage-mode or current-mode amplifier to amplify the readout signal in preparation for analog-to-digital (A/D) conversion within ADC 175. In alternative embodiments, the source-follower-bias current source may be implemented separately from the amplifier component of gain circuitry 173 or the amplifier component may be omitted (leaving only the source-follower-bias current source). Analog-to-digital converter 175 (ADC) may be implemented by a successive-approximation register (SAR), single-slope ADC (SSADC), sigma-delta ADC or any other practicable A/D conversion circuitry. Also, though not specifically shown, sample-and-hold circuitry may be provided within readout logic 165 (e.g., prior to the channel multiplexer, between the channel multiplexer and gain component, or between the gain component and analog-to-digital converter) to enable analog-signal sample and hold operation. The sample and hold circuitry may include a subtraction/differencing unit (also not shown) to enable analog-domain charge-state/reset-state signal correlation (i.e., by subtracting the reset-state sample from the corresponding charge-state sample) and thus feed a CDS sample to ADC 175. Alternatively, the reset-state signal and charge-state signal may be sequentially digitized by ADC 175 and then differenced in the digital domain (digital CDS operation). In either case, a stream of digitized CDS readout values are supplied to memory 177 for storage (i.e., triggered by a store-enable signal (SE) from readout controller) with successively stored primary and secondary readout values forwarded to read-merge logic for combination into a pixel output value 180 (triggered by merge-enable (ME) from readout controller).

In low-latency column readout implementations, respective (separate, dedicated) analog gain and ADC components may be provided for the primary and secondary readouts as shown at 185 to enable time-staggered, concurrent processing of the two readouts. Also, in embodiments (or configurations) that implement selective secondary channel readout, a threshold comparator 181 may be provided to signal an over-threshold condition OT (or under-threshold condition) to readout controller 163 and thus enable the readout controller to selectively generate (or refrain from generating) secondary channel readout control signals (RST2, SEL2, TG2). Though shown in the digital domain (after ADC), the threshold comparison may be implemented in the analog domain in alternative embodiments.

In the exemplary operational sequence shown at 200 (FIG. 3), readout controller 163 commences split-channel readout at 201 by configuring channel multiplexer 171 to couple the primary channel output line to the downstream column readout circuitry (i.e., raising or lowering channel-select signal, CS, as the case may be). At 203, the readout controller deterministically asserts readout control signals, convert-enable signal (CE) and store-enable signal (SE) to enable primary channel readout (resetting the primary floating diffusion (FD) node, sampling the FD reset-state, enabling primary channel charge transfer and sampling the FD charge-state), A/D conversion of the primary readout signal and storage of the CDS primary readout value within memory 177 (with the reset-state/charge-state differential being effected in the analog domain prior to ADC or in the digital domain after). In a selective readout embodiment, the output of comparator 181 is evaluated at 205, with affirmative over-threshold determination (over-threshold signal OT asserted) triggering channel multiplexer switchover at 209, secondary channel readout, digitization and storage (211) and finally merger of the CDS primary and secondary readout values at 213. If the primary readout is determined not to exceed the two-phase readout threshold (negative determination at 205), secondary channel readout is skipped, and the CDS primary readout value is forwarded as the finalized pixel readout result (e.g., skipping the readout merge or merging the primary readout value with a null or zeroed secondary value). In a deterministic readout embodiment, the secondary readout operations at 209 and 211 are executed without condition (i.e., skipping assessment at 205), though a threshold evaluation of the primary readout and/or secondary readout may still be carried out to selectively merge the primary and secondary readout results (e.g., skipping the merge operation at 213 if the primary readout is below a near-max threshold and/or if the secondary readout is below a noise-floor threshold). In any case, a row pointer is incremented (215) at readout completion to select a subsequent pixel row for readout in the next loop iteration.

FIG. 4 illustrates an alternative readout sequence that may be implemented by readout controller 163 of FIG. 3, for example, in a revised implementation or in response to a programmed readout policy setting. In this case, primary channel readout is executed in the operations at 231 and 233 (which correspond to the operations at 201 and 203 in the operational flow of FIG. 3), followed by threshold evaluation at 235, flipping the channel multiplexer to enable alternate channel readout (i.e., the secondary channel in the first pass) and incrementing a readout counter (N) if the threshold evaluation indicates a readout channel saturation (i.e., that photocharge remains or likely remains in the photodiode after the preceding readout). After flipping the channel multiplexer (i.e., changing the state of the channel-select signal to select the alternate pixel readout channel) and incrementing the readout count, the readout (including digitization and result storage) and threshold evaluation operations at 233 and 235 are repeated with respect to the newly selected readout channel (the secondary readout channel in the second pass), with this readout loop continuing—alternating between the primary and secondary channel—until either a maximum readout count is reached (i.e., N reaches a predetermined maximum corresponding to a photocharge level at or above the full well capacity of the photodiode) or an under-threshold readout is detected (negative determination at 235). By this operation, pipelined low-latency readouts of the primary and secondary channels (which may be implemented with equal conversion gains for readout uniformity) may be executed iteratively (1, 2, 3, 4, ..., or N=max individual channel readouts) to progressively drain photocharge from the photodiode via individual transfers (photodiode to floating diffusion node) with exceedingly high conversion gain and correspondingly low input-referred noise. Upon loop exit (negative determination at 235 or readout count reaching maximum), the multiple readouts (N readouts) are merged at 239 and then the row pointer is incremented at 241 to proceed to the next row. To provide deterministic readout timing (e.g., in a rolling shutter imager), a fixed time may be allotted to enable a predetermined number K of channel readouts per pixel row (i.e., with K=2 corresponding to the dual-channel readout shown in FIG. 3), with one or more channel readout intervals unused in low-light exposures.

FIG. 5 illustrates an alternative imaging IC architecture 260 in which column readout logic 261 is shared among multiple (or all) columns of split-readout pixels within pixel array 161. In the depicted embodiment a channel multiplexer receives primary and secondary readout signals from 'n' pixel columns and thus multiplexes 2n readout signals to a shared readout path implemented generally as discussed in reference to FIG. 3. The channel-select signal (CS) delivered to multiplexer 263 and other control signals generated by readout controller 265 (e.g., store-enable to memory 267) may be implemented by multi-bit signals as necessary to capture multi-channel pixel readout data for each of the n pixel columns.

FIG. 6 illustrates another imaging architecture 300 in which a single-slope ADC 301 is distributed across readout logic paths of multiple (or all) split-readout pixel columns within pixel array 161. In the embodiment shown, a column-shared ramp generator 303 outputs digital and analog ramp signals (e.g., the digital ramp signal being a monotonic multi-bit count value and the analog ramp signal being a digital-to-analog conversion of that count value) to per-column register elements 305 and per-column comparators 307, respectively. Readout controller 309 operates all the split-readout pixels of a selected row in lock step so that the primary (and then secondary) readout signal for each pixel column is simultaneously routed (via channel multiplexer 171 and optional gain element 173) to a respective one of comparators 307. As the analog and digital ramp signals progress stepwise from minimum to maximum levels (the analog ramp may be a monotonically decreasing signal, with the maximum level being a less positive voltage than the minimum), the outputs of comparators 307 will transition as the analog ramp exceeds (e.g., falls below) the incoming readout signal, triggering capture of the corresponding digital ramp value (digital count) within register 305 as the A/D conversion result. In the single SSADC implementation of FIG. 3, the ramp generator is restarted following primary channel A/D conversion (i.e., after the ramp outputs have progressed from minimum to maximum values and/or after all comparators/registers have been triggered and the ADC results transferred to downstream memory) to implement secondary channel A/D conversion and, in a digital CDS embodiment, may be restarted four-times per dual-channel readout to digitize the reset-state and charge-state readout signals for both channels. In embodiments having more than two readout channels per pixel (or in which two or more readout channels are iteratively enabled as in FIG. 4) the SSADC operation may be completed as many times as necessary (up to the readout channel count or iteration limit) to digitize incoming readout signals. In digital CDS implementations, reset-state SSADC ramps may progress through a shorter range than charge-state SSADC ramps (i.e., in view of the much smaller range of valid reset-state signals) to reduce overall A/D conversion time.

Still referring to FIG. 6, separate per-readout-channel SSADCs 301 may be provided in alternative embodiments to enable pipelined primary and secondary channel A/D conversion. For example, ramp generation for the primary channel SSADC may commence shortly after primary channel transfer (e.g., after a settling delay sufficient to yield stable primary readout signals at the inputs of comparators 307) with ramp generation for the secondary channel SSADC commencing shortly thereafter—before the primary-channel ramp has completed so that the two time-staggered ramp generations overlap for at least part of their progression.

FIG. 7 illustrates exemplary pipelining of primary and secondary channel readouts, showing time-staggered primary channel CDS operations (upper row) and secondary channel CDS operations (lower row). For ease of explanation, constituent floating-diffusion reset, reset-state sampling, charge transfer, charge-state sampling and ADC operations are shown as consuming identical time intervals (in reality the different operations may consume different amounts of time), with secondary channel operations being delayed relative to primary channel operations by the time allotted to a single operation. Thus, the primary channel floating diffusion node is reset at 341 followed by simultaneous (or at least concurrent) execution of primary-channel reset-state sampling 343 and secondary channel FD reset 344. Continuing this parallel, but time-staggered sequencing, primary-channel charge transfer is carried out at 345 concurrently with reset-state sampling in the secondary channel (346), followed by concurrent primary-channel charge-state sampling (347) and secondary-channel charge transfer (348), then concurrent primary channel A/D conversion (349) and secondary-channel charge-state sampling 350. The row-i split-channel readout is concluded (at least through A/D conversion) with the secondary-channel ADC operation at 352 (e.g., executed concurrently with the start of row i+1 readout—primary-channel FD reset). Note that the reset-state and charge-state sampling operations (343, 346, 347, 350) are shown as analog-domain sample-and-hold actions (which may include possible analog-domain subtraction of the reset-state sample from the charge-state sample). In other embodiments, those sampling operations may be carried out in the digital domain (direct A/D conversion of the output signals for a given readout channel without analog sample/hold). In any case, the pipelined primary and secondary channel readouts not only shorten the overall per-row readout latency (enabling more rapid row sequencing and thus shorter minimum exposure times, higher oversampling rates, etc.) but also shrink the time between primary and secondary charge transfer operations 345 and 348 relative to the time that would be required for successive rather than parallelized execution of the primary and secondary readout sequences, thus reducing likelihood of motion artifacts or other temporal distortion.

FIG. 8 illustrates embodiments of per-column memory elements 361 and read-merge logic 363 that may be used to implement the memory and read-merge logic components shown in FIG. 3. In the example shown, registers 367 and 369 are provided within memory 361 to store digitized primary and secondary readout values (e.g., CDS values), respectively, with the stored readout values supplied to read-merge logic 363 for combination. Read-merge logic optionally applies gain calibration (gc1, gc2) or digital weighting (w1, w2) to the incoming readout values before summing those values (375) to produce a composite pixel value 180. In one embodiment, gain calibration values may be uniform across the split-pixel array (or relatively large sub-regions thereof) so that a relatively small number of calibration values and/or weight values may be applied to all or a large number of the pixel readouts, making on-die gain-calibration value and/or weight value storage readily feasible (i.e., storage on same die as split-readout pixel array). In other embodiments per-pixel (or per-pixel sub-group) gain calibration values and/or weight values may be stored in an off-die memory—for example, in an SRAM or DRAM storage within an IC stacked with (and interconnected to) the split-readout imager die to enable low power/low-latency gain-calibration value/weight value delivery to read-merge logic 363. Also, the gain-calibration values and/or weight values may be applied elsewhere in the column readout logic, including in the analog readout path (e.g., within analog gain component 173 shown in FIG. 3).

Still referring to FIG. 8, in the case of selective secondary channel readout (i.e., where secondary channel readout may be skipped if the primary channel readout yields an under-threshold signal or value), the readout value within register 369 may be zeroed to yield a zero secondary-readout contribution to summing element 375. In the embodiment shown in FIG. 9 for example, an under/over-threshold comparison result (i.e., indicating an under-threshold or over-threshold primary readout) may be stored within memory 385 (i.e., within element 386) and applied within read-merge logic 387 to zero the secondary contribution. Though shown conceptually as a selection of a zero-value within multiplexer 388, secondary-channel contribution nulling may instead be implemented in various ways and at various points along the column-readout path (zeroing in register 369, zeroing the secondary-path gain-calibration and/or weighting multipliers) or by selecting the output of the primary channel readout path as the finalized pixel value instead of the output of summer 375, etc. In all cases, logic circuitry unused in under-threshold (primary-channel-only) readouts may be disabled to save power. Also, the under/over-threshold determination may be implemented in the digital domain as shown by comparator 181 or in the analog domain, with the determination/comparison result being applied to read-merge logic 387 directly (without prior storage) or via storage element 386. While charge-state and reset-state sample-and hold elements 391 and 393 (and an analog differencing/subtraction element 395) are depicted in FIG. 8 to support analog-domain CDS operation, charge-state and reset-state signals may be digitized within ADC 175 prior to differencing (digital domain CDS) with or without prior sample-and-hold.

FIG. 10 illustrates an embodiment of a split-readout pixel having non-uniform primary and secondary readout-channel conversion gains and corresponding floating-diffusion node capacities that collectively match the photodiode full-well capacity. Primary and secondary readout channel components generally match those shown in FIG. 1, but with substantially lower capacitance in the primary floating diffusion node than in the secondary floating confusion node and thus higher primary-channel conversion gain than secondary-channel conversion gain. In one embodiment, for example, the primary-channel conversion gain is approximately eight times that of the secondary channel at, for example, 400 µv/e– (400 microvolts per electron) vs 50 µv/e– for the secondary channel. Assuming a CMOS process that yields a 1.5 volt output swing on both readout channels (i.e., FD reset voltage minus photodiode pinning voltage=1.5 volts), the collective charge-transfer capacity of the primary and secondary channels is 1.5 v/(400 µv/e–)+1.5 v/(50 µv/e–)=33,750e–. By designing the pinned photodiode (PPD) to have a full-well capacity (Q) of roughly that same electron count, the photowell can be completely emptied through split-channel readout (avoiding loss of dynamic range), while achieving exceptional low-light sensitivity through charge transfer exclusively (or predominantly) via the high-conversion-gain primary channel.

The voltage noise within the in-pixel source-follower transistors (SF1 and SF2) shown in FIG. 1 and other embodiments herein tend to have device-wise (per transistor) variation that constitutes the predominant source of pixel-to-pixel read-noise variation in the image sensor as a whole. This noise variation is caused by randomly distributed fabrication-related defects or non-ideal atomic structures in the pixel detectors so that some readout channels may show extremely high noise due to the random telegraph noise (RTN) and flicker noise caused by the defects, and other readout channels exhibiting substantially lower noise (fewer and/or less significant defects)—variation that may occur even between the two (or more) channels of a single split-readout pixel. FIG. 11 illustrates a split-readout CMOS image sensor embodiment 420 in which the primary-channel/secondary-channel designation within each pixel (readout channels having nominally equal conversion gains) may be selectively and programmatically reversed (flipped or swapped) according to a calibration-time noise assessment, thus enabling operation of the lowest-noise readout channel as the primary readout channel. In one embodiment, for example, the noise characteristics of each of the nominally primary and secondary readout channels within each split-readout pixel are evaluated to determine which channel exhibits the best input-referred-noise performance, recording for each pixel a "reverse" bit in either an asserted state that reverses the primary/secondary designation if the secondary channel exhibits better low-light noise performance or in a deasserted state that leaves the a dual-readout-channel pixels in the default primary/secondary designation if the primary channel exhibits better noise characteristics (or if noise characteristics are deemed indistinguishable). In the implementation shown, multiplexers 421 and 423 are provided with respect to each split-readout pixel to swap the default primary/secondary pixel control signals delivered to the corresponding split-reset pixel if the reverse bit ("Rev") for the corresponding pixel column is asserted (logic '1' in this example) and to pass those signals to the pixel without swapping if the reverse bit is deasserted. Exclusive OR gate 425 similarly reverses the state of the channel-select signal (CS) supplied to channel multiplexer 171 if the reverse bit is set. If per-readout-channel ADCs are provided as in 185 of FIG. 3, output path multiplexers similar to 421 and 423 may be provided to selectively route the column output signals (Out1 and Out2) to either of the ADCs according to reverse bit state or circuitry within the readout controller may operate one readout path or the other as primary (and the other as secondary) according to the reverse bit, for example triggering A/D conversion first within the designated primary column output path. As pixel readout progress from one row to the next, a new page of calibration data (set of N reverse bits according to pixel-row width) may be retrieved from calibration data store 430 to establish primary/secondary designation for that next pixel row. In sensors having sufficient die area, calibration data store 430 may be implemented on the same die as the split-readout pixel array. In other embodiments, calibration data store 430 (which may additionally store weighting or other per-pixel values) may be implemented in a separate chip stacked with (and interconnected to) the die containing the split-readout pixel array.

In a number of embodiments, the additional transistors and floating diffusion node(s) provided to enable multichannel readout consume little additional area relative to the photodiode footprint and thus do not significantly impact sensor fill-factor (e.g., photodiode relatively large and/or overlaps floating diffusion nodes or other structures in whole or part). In embodiments having smaller photodiodes and/or for which even a relatively small fill-factor impact is undesirable, readout channel resources may be shared between neighboring pixels to reduce the net transistor count within a split-readout pixel array. FIG. 12 illustrates an embodiment of a split-readout pixel array in which the secondary readout channel for one pixel serves as the primary readout channel for an adjacent pixel—a shared readout-channel arrangement that extends across the pixel array (each adjacent pair of pixels shares a readout channel) to maintain the total transistor count (and thus raise the imager fill factor) at or near that of a conventional single-readout-channel pixel array. In the depicted embodiment (an excerpt along one row of split-readout pixels), floating diffusion node FD34, reset transistor RST34, source-follower transistor SF34 and read-select transistor SEL34 collectively serve as both a secondary readout channel for photodiode PPD3 and primary readout channel for photodiode PPD4. Separate transfer gates TGa and TGb are provided with respect to PPD3 and PPD4 and more generally with respect to each shared readout channel so that the net extra die-area consumption required for split-readout operation resolves to an extra transfer gate per pixel (to enable photocharge transfer to two different floating diffusion nodes), and unshared readout circuitry for pixels at the periphery (end-of-row locations) of the split-readout pixel array.

Still referring to FIG. 12 and assuming a two-phase readout within pre-assigned primary and secondary readout channels having equal conversion gains, primary-channel readout within the pixel row commences with reset-state output via all readout channels—switching on the row-select transistors (SEL34, SEL45, SEL56, etc.) and pulsing the reset transistors (RST34, RST45, RST56, etc.). Shortly thereafter (long enough for reset-state output signal signalization and sampling), photocharge is transferred via the primary-channel transfer gates (TGa) to the adjacent floating diffusion node to produce a charge-state output via the shared readout channel. Thus, photocharge is transferred (in part or whole according to accumulation level) from PPD4 to FD34 to yield a primary-channel charge-state output signal on Out34; from PPD5 to FD45 to yield a primary-channel charge-state output signal on Out45, from PPD6 to FD56 to yield a primary-channel charge-state output signal on Out56, and so forth. After those output signals are sampled (e.g., through analog sample-and-hold or direct A/D conversion), secondary channel readout commences with repetition of the floating-diffusion reset and reset-state output signal generation, followed by residual photocharge transfer via the secondary-channel transfer gates (TGb) to the other floating diffusion node adjacent each photodiode. That is, photocharge remaining after the primary channel readout is transferred from PPD4 to FD45 to yield a secondary-channel charge-state output signal on Out45; from PPD5 to FD56 to yield a secondary-channel charge-state output signal on Out56 and so forth to conclude the split-readout operation with respect to the pixel array.

FIG. 13 illustrates a channel multiplexing arrangement that may be implemented in the column-readout logic of an imager having a shared-channel split-readout pixel array per FIG. 12. As shown, each of the shared-channel output lines (Out01, Out12, Out23, etc.) is coupled to a respective input of a two-input channel multiplexer 501 that serves adjacent pixel columns. As the channel-select signal (CS) is alternated between primary and secondary channel selections, each multiplexer 571 routes corresponding primary and secondary readout signals from adjacent, pixel-shared readout lines to the column logic path for the appropriate pixel column. In the depicted example, the column logic path includes a channel-shared gain element 173 and channel-shared ADC 175 as shown in FIG. 3. In alternative embodiments, a dedicated gain element (if any) and ADC may be provided for each column output line, with post-ADC multiplexers provided to route the ADC result to pre-merge storage elements for the subject pixel column.

FIG. 14 illustrates an exemplary operation of channel multiplexers 501 corresponding to those shown in FIG. 13. As shown, readout operations are sequenced from row to row within the pixel array (row i, row i+1, etc.) with each row readout split into successive primary and secondary channel readouts. During primary channel readout, the channel-select signal (CS) is driven low to route the reset-state and charge-state signals corresponding to the primary channel for each pixel in the selected row to downstream column readout logic—that is to select the reset-state and charge-state signal outputs for the leftmost of the two photodiodes that share the readout channel (i.e., the readout channel to which photocharge is transferred via transfer gate TGa in FIG. 13). After primary channel readout is complete (e.g., after digitization or analog sample-and-hold), the channel-select signal is raised to route, to the downstream readout logic, the reset-state and charge-state signals corresponding to the secondary channel for each pixel—the readout channel to which photocharge is conveyed via transfer gate TGb in FIG. 13. This alternation is repeated for each row readout to complete the pixel array scan.

FIG. 15 illustrates a portion of a split-readout pixel array having four shared readout channels per pixel. In the example shown, each photodiode (PPD) in the pixel array is coupled via four transfer gates TGa, TGb, TGc and TGd to four floating diffusion nodes, respectively (i.e., FD[i,j+1], FD[i,j+2], FD[i+1,j+1] and FD[i+1,j+2] as shown at 525 for the photodiode 527 in row 'i', column 'j+1') with those floating diffusion nodes being constituents of respective readout channels a, b, c and d for photodiode 527. Each of those floating diffusion nodes is shared by three neighboring four-readout-channel pixels with, for example, the floating diffusion node that constitutes part of readout channel 'a' for photodiode in row 'i+1' and column 'j+1' (i.e., FD[i+1,j+1]) also constituting part of readout channel b for photodiode [i+1,j], part of readout channel c for photodiode [i, j+1] and part of readout channel d for photodiode [i, j]—a readout sharing arrangement that is implemented symmetrically for all interior pixels of the pixel array (pixels at the edge of the array share two readout channels with interior neighbors). The complete shared readout channel for the four photodiodes [i, j], [i, j+1], [i+1, j] and [i+1, j+1] is depicted at 531. As shown, each of the row control signals (i.e., applied to all split-readout pixels in the same row) is asserted to control readout operations for an adjacent pair of pixel rows (row i and row i+1 in this example). More specifically, reset signal Rst i/i+1 is asserted to reset floating diffusion node FD[i+1,j+1] prior to photocharge transfer for each of the four pixels sharing the readout channel (i.e., the two pixels in row i and the two pixels in row i+1) and select signal Sel i/i+1 is asserted to enable source-follower signal generation (via SF i/i+1) on output line Out[j,j+1] according to the floating diffusion node potential for each of the four pixels.

FIG. 16 illustrates an exemplary channel multiplexing arrangement with respect to the channel a, b, c and d readouts from each of the pixels within a given row of the FIG. 15 pixel array. Thus, signal TGa is pulsed to implement charge-state readout of channel 'a', with channel-select signal (CS) driven low to select the channel-a readout path, followed by pulsing of signal TGb to implement charge-state readout via channel b, with the channel-select signal driven high to select the channel-b readout path. Like operations are then carried out for channels c and d (pulsing TGc and lowering the channel-select signal, then pulsing TGd and raising the channel select signal). In embodiments having a dedicated A/D converter per column output line (i.e., one ADC for channels a and c, and another for channels b and d), channel multiplexing may be implemented downstream from A/D conversion.

Figure 17:
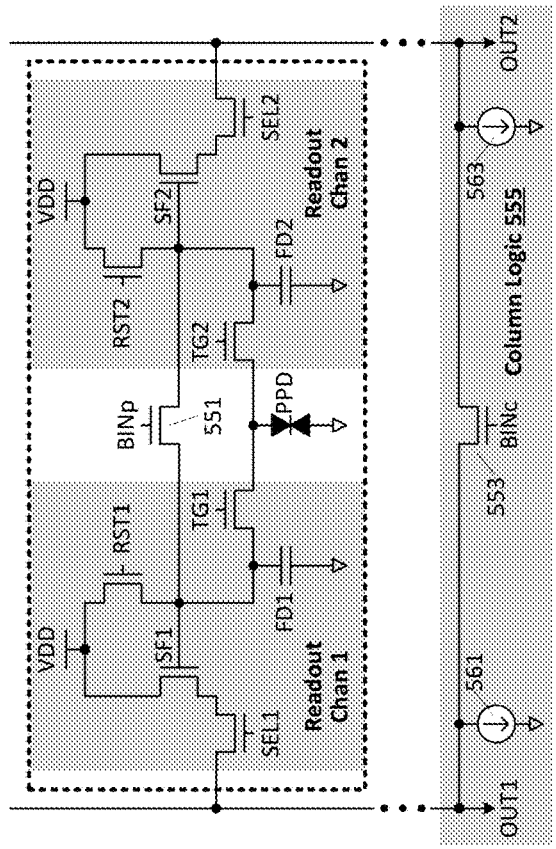
FIG. 17 illustrates an embodiment of a split-readout pixel having an in-pixel binning transistor coupled between respective floating diffusion nodes of two readout channels.

FIG. 17 illustrates an alternative split-readout pixel embodiment 550 generally implemented as discussed above (e.g., in reference to FIG. 1), but with an in-pixel binning transistor 551 coupled between the floating diffusion nodes FD1 and FD2 of the two readout channels (which may be identically implemented or implemented with different conversion gains as discussed). When binning transistor 551 is switched on (e.g., in response to a pixel control signal, BINp, applied to gates of binning transistors 551 within all pixels of a pixel-row selected for readout via a pixel control line that extends row-wise across the pixel array—one such control line per row of pixels), floating diffusion nodes FD1 and FD2 are effectively coupled together to form a composite floating diffusion node and thus a capacitive node having a capacitance essentially equal to the sum of the capacitances of the individual floating diffusion nodes—overall, a higher capacitance that increases charge-holding capability during low-conversion-gain readout without consuming additional die area (other than that required for the binning transistor 551). In the depicted embodiment, column-binning transistor 553 is provided in column readout logic 555 (and switched on in response to a column logic control signal BINc) to switchably couple the output lines (Out1, Out2) for the two pixel readout channels together, thus increasing the effective width of the source-follower circuit (as both SF1 and SF2 will be operated at the same time and biased by respective current sources 561 and 563) and thereby reducing noise in a low-gain signal readout (i.e., when both BINp and BINc) are asserted.

Still referring to FIG. 17, instead of asserting BINp and BINc simultaneously (i.e., to implement a low-noise, low-gain readout simultaneously via the two pixel readout channels and column output lines Out1, Out2), BINp may be asserted without BINc (i.e., to switch on in-pixel binning transistor 551, but not column-binning transistor 553) and thus enable low-gain (joint FD1, FD2 capacitance) readout via only one of the two pixel-readout channels (i.e., readout channel 1 or readout channel 2)—an operation that enables low-gain in-pixel binned readout with the various shared-readout-channel architectures shown in FIGS. 12-16. Alternatively, column-binning transistor 553 may be switched on while in-pixel binning transistor 551 is switched off (asserting BINc, deasserting BINp) to increase the bandwidth of the source follower for a given readout channel (i.e., by drawing a current from one of the output lines that is the sum of the currents through current sources 561 and 563) and thus reduce output signal settling time. Note that either of the two alternative operating modes (i.e., in which only one of binning transistors 551 and 553 is switched on) may be implemented as the sole operating mode in which case the unused binning transistor (553 or 551) may be omitted from the circuit architecture.

Figure 18:
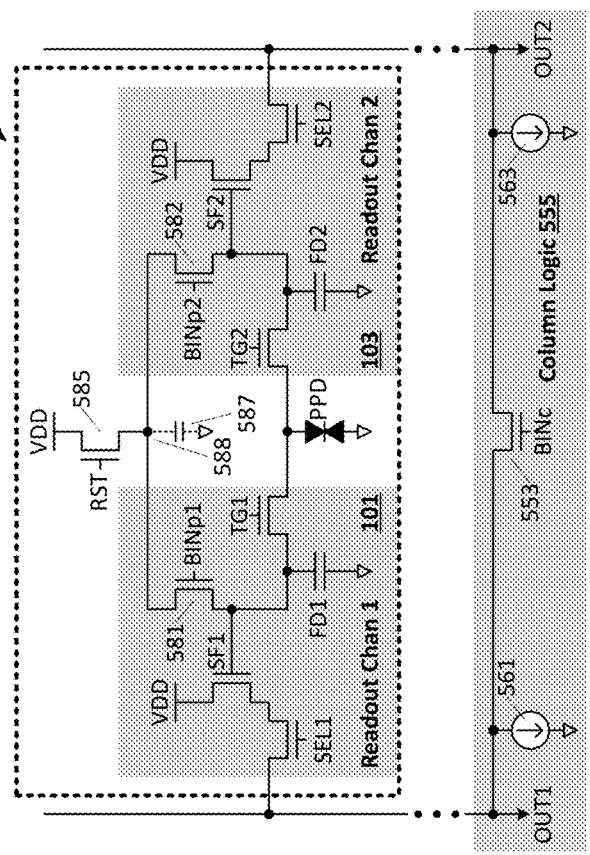
FIG. 18 illustrates an alternative split-readout pixel embodiment having a dedicated in-pixel binning transistor per readout channel.

FIG. 18 illustrates an alternative split-readout pixel embodiment 580 having a dedicated in-pixel binning transistor 581, 582 per readout channel. As shown, each in-pixel binning transistor 581, 582 is coupled in series between a reset transistor 585 and respective floating diffusion node (FD1, FD2) so that (i) no capacitance is added to either floating diffusion node relative to the architecture shown in FIG. 1 (in contrast to the FIG. 17 embodiment, where incremental capacitance is added by the parallel coupling of binning transistor 551 and a reset transistor (RST1 or RST2)

to each floating diffusion node), and (ii) a solitary reset transistor 585 may be used (instead of the two transistors RST1, RST2 shown in FIG. 17) such that the per-pixel transistor count is unchanged relative to that in FIG. 17. During signal readout, control signals BINp1 and BINp2 may be simultaneously asserted to effect the in-pixel-binned (low-gain) readout discussed in reference to FIG. 17 (i.e., simultaneous assertion of BINp2 equivalent to BINp assertion in FIG. 17 embodiment), with optional assertion of BINc to reduce noise during low-gain readout. Additional capacitance 587 may be switchably or permanently coupled to node 588 (the interconnect between reset transistor 585 and binning transistors 581/582) to further lower the binned-readout conversion gain (and increase full-well capacity of the switchably-joined FD1/FD2 floating diffusions). The various options discussed above for assertion of BINc without asserting BINp1/BINp2 and vice-versa apply equally to split-readout pixel 580.

In the embodiment of FIG. 18, binning control signals BINp1 and BINp2 are delivered via separate pixel control lines (and output from distinct logic gates) to enable selective reset of the floating diffusion node for either readout channel (e.g., resetting FD1 and not FD2 by simultaneously asserting RST and BINp1 while deasserting BINp2 and, conversely, resetting FD2 and not FD1 by simultaneously asserting RST and BINp2 while deasserting BINp1). In alternative embodiments, a single pixel control line (conveying control signal BINp) may be coupled in common to the gates of transistors 581 and 582 so that floating diffusion nodes FD1 and FD2 are simultaneously reset in all reset operations (i.e., effected by asserting at least RST and BINp). In those embodiments, correlated double-sampling readout may be effected sequentially with respect to each channel with incidental and non-consequential reset of the floating diffusion node of the idle channel (channel 1 or channel 2 during CDS readout via channel 2 or channel 1, respectively).

The various embodiments of split-readout pixel arrays, column readout logic, readout controllers and so forth disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply details not required to practice those embodiments. For example, any of the specific readout-channel counts, numbers of shared readout circuits, threshold levels, amplification levels, conversion gains, component counts, interconnect topologies, sensor implementations, transistor types (e.g., NMOS or PMOS) component elements and the like can be different from those described above in alternative embodiments. Signal paths depicted or described as individual signal lines may instead be implemented by multi-conductor signal buses and vice-versa and may include multiple conductors per conveyed signal (e.g., differential or pseudo-differential signaling). The term "coupled" is used herein to express a direct connection as well as a connection through one or more intervening functional components or structures. Device configuration or programming can include, for example and without limitation, loading a control value into a register or other storage circuit within an integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device (e.g., amplification factor, latching threshold, etc.). The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated-circuit image sensor comprising:
   first and second photodetectors;
   first, second and third readout lines;
   first, second and third readout circuits coupled respectively to the first, second and third readout lines;
   first and second transfer gates coupled between the first photodetector and the first and second readout circuits, respectively; and
   third and fourth transfer gates coupled between the second photodetector and the second and third readout circuits, respectively.

2. The integrated-circuit image sensor of claim 1 further comprising control circuitry to:
   concurrently activate the first transfer gate, third transfer gate, first readout circuit and second readout circuit during a first readout interval to concurrently generate first and second output signals on the first and second readout lines, respectively; and concurrently activate the second transfer gate, fourth transfer gate, second readout circuit and third readout circuit during a second readout interval to concurrently generate third and fourth output signals on the second and third readout lines, respectively.

3. The integrated-circuit image sensor of claim 2 wherein the first and second readout intervals transpire back-to-back such that elapsed time between commencement of the first readout interval and conclusion of the second readout interval nominally matches a sum of respective durations of the first and second readout intervals.

4. The integrated-circuit image sensor of claim 2 wherein the control circuitry enables the concurrent operation of the first and second readout circuits after an exposure interval in which a first quantity of photocharge is accumulated within the first photodetector and a second quantity of photocharge is accumulated within the second photodetector, and wherein the first and third output signals correspond to respective and complementary fractions of the first quantity of photocharge and the second and fourth output signals correspond to respective and complementary fractions of the second quantity of photocharge.

5. The integrated-circuit image sensor of claim 2 wherein the control circuitry to concurrently activate the first transfer gate and third transfer gate during the first readout interval and to concurrently activate the second transfer gate and fourth transfer gate during the second readout interval comprises circuitry to (i) assert, during the first readout interval, a first transfer-gate control pulse on a first control line coupled in common to the first and third transfer gates, and (ii) assert, during the second readout interval, a second transfer-gate control pulse on a second control line coupled in common to the second and fourth transfer gates.

6. The integrated-circuit image sensor of claim 2 wherein the first, second and third readout circuits comprise respective first, second and third read-select transistors that are coupled respectively to the first, second and third readout lines, and wherein the control circuitry to concurrently activate the first and second readout circuits during the first readout interval and to concurrently activate the second and third readout circuits during the second readout interval comprises circuitry to assert a control signal on a read-select control line coupled in common to gate terminals of the first, second and third read-select transistors during the first readout interval and during the second readout interval.

7. The integrated-circuit image sensor of claim 1 further comprising:
first and second analog-to-digital conversion (ADC) circuits;
a first multiplexer circuit having inputs coupled to the first and second readout lines and an output coupled to the first ADC circuit; and
a second multiplexer circuit having inputs coupled to the second and third readout lines and an output coupled to the second ADC circuit.

8. The integrated-circuit image sensor of claim 7 further comprising control circuitry to:
concurrently activate the first transfer gate, third transfer gate, first readout circuit and second readout circuit during a first readout interval to concurrently generate first and second output signals on the first and second readout lines, respectively;
switchably couple the first and second readout lines to the first and second ADC circuits via the first and second multiplexer circuits, respectively, during the first readout interval such that the first and second ADC circuits receive the first and second output signals; and
enable ADC operations within the first and second ADC circuits to produce first and second digital values corresponding to the first and second output signals.

9. The integrated-circuit image sensor of claim 8 wherein the control circuitry is further to:
concurrently activate the second transfer gate, fourth transfer gate, second readout circuit and third readout circuit during a second readout interval to concurrently generate third and fourth output signals on the second and third readout lines, respectively;
switchably couple the second and third readout lines to the first and second ADC circuits via the first and second multiplexer circuits, respectively, during the second readout interval such that the first and second ADC circuits receive the third and fourth output signals; and
enable ADC operations within the first and second ADC circuits to produce third and fourth digital values corresponding to the third and fourth output signals.

10. The integrated-circuit image sensor of claim 9 further comprising circuitry to merge the first and third digital values into a first merged digital value representative of photocharge accumulated within the first photodetector during an exposure interval and to merge the second and fourth digital values into a second merged digital value representative of photocharge accumulated within the second photodetector during the exposure interval.

11. A method of operation within an integrated-circuit image sensor, the method comprising:
concurrently generating during a first readout interval (i) a first output signal on a first readout line corresponding to photocharge accumulated within a first photodetector and (ii) a second output signal on a second readout line corresponding to photocharge accumulated within a second photodetector; and
concurrently generating during a second readout interval (i) a third output signal on the second readout line corresponding to the photocharge accumulated within the first photodetector and (ii) a fourth output signal on a third readout line corresponding to the photocharge accumulated within the second photodetector.

12. The method of claim 11 wherein the first and second readout intervals transpire back-to-back such that elapsed time between commencement of the first readout interval and conclusion of the second readout interval nominally matches a sum of respective durations of the first and second readout intervals.

13. The method of claim 11 further comprising accumulating the photocharge within the first photodetector and the photocharge within the second photodetector during an exposure interval that precedes the first and second readout intervals, and wherein the first and third output signals correspond to respective and complementary fractions of the photocharge accumulated within the first photodetector during the exposure interval, and the and second and fourth output signals correspond to respective and complementary fractions of the photocharge accumulated within the second photodetector during the exposure interval.

14. The method of claim 11 wherein concurrently generating the first and second output signals on the first and second readout lines during the first readout interval comprises activating, during the first readout interval, a first transfer gate coupled between the first photodetector and a readout circuit for the first readout line and a second transfer gate coupled between the second photodetector and a readout circuit for the second readout line, and wherein concurrently generating the third and fourth output signals on the second and third readout lines during the second readout interval comprises activating, during the second readout interval, a third transfer gate coupled between the first photodetector and the readout circuit for the second readout line and a fourth transfer gate coupled between the second photodetector and a readout circuit for the third readout line.

15. The method of claim 14 wherein concurrently generating the first and second output signals on the first and second readout lines during the first readout interval and concurrently generating the third and fourth output signals on the second and third readout lines during the second further comprises switching on respective read-select transistors within the readout circuits for the first, second and third readout lines during the first readout interval and during the second readout interval, each of the read-select transistors having a terminal coupled to a respective one of the first, second and third readout lines.

16. The method of claim 11 further comprising:
switching first and second multiplexer circuits to a first state during the first readout interval to route the first and second readout signals to first and second analog-to-digital conversion (ADC) circuits, respectively; and
switching first and second multiplexer circuits to a second state during the second readout interval to route the third and fourth readout signals to the first and second ADC circuits, respectively.

17. The method of claim 16 further comprising enabling the first and second ADC circuits to produce first and second digital values corresponding to the first and second output signals and then enabling the third and fourth ADC circuits to produce third and fourth digital values corresponding to the third and fourth output signals.

18. The method of claim 17 further comprising merging the first and third digital values into a first merged digital value representative of the photocharge accumulated within the first photodetector and merging the second and fourth digital values into a second merged digital value representative of the photocharge accumulated within the second photodetector.

19. The method of claim 17 wherein enabling the first and second ADC circuits to produce the first and second digital values comprises triggering at least one of (i) a successive-approximation ADC operation within the first and second ADC circuits or a single-slope ADC operation within the first and second ADC circuits with respect to a ramp signal and ram count value supplied to the first and second ADC circuits.

20. An integrated-circuit image sensor comprising:
first and second photodetectors;
first, second and third readout lines;
means for concurrently generating during a first readout interval (i) a first output signal on the first readout line corresponding to photocharge accumulated within the first photodetector and (ii) a second output signal on the second readout line corresponding to photocharge accumulated within the second photodetector; and
concurrently generating during a second readout interval (i) a third output signal on the second readout line corresponding to the photocharge accumulated within the first photodetector and (ii) a fourth output signal on the third readout line corresponding to the photocharge accumulated within the second photodetector.

* * * * *

UNITED STATES PATENT AND TRADEMARK OFFICE
CERTIFICATE OF CORRECTION

| | |
|---|---|
| PATENT NO. | : 11,330,218 B2 |
| APPLICATION NO. | : 16/871720 |
| DATED | : May 10, 2022 |
| INVENTOR(S) | : Jiaju Ma and Saleh Masoodian |

It is certified that error appears in the above-identified patent and that said Letters Patent is hereby corrected as shown below:

In the Specification

Column 1, Line 14, insert --This invention was made with government support under grant number 1747016 awarded by the National Science Foundation. The government has certain rights in the invention.--

Signed and Sealed this
Fifth Day of July, 2022

*Katherine Kelly Vidal*

Katherine Kelly Vidal
*Director of the United States Patent and Trademark Office*